United States Patent [19]

Amouroux et al.

[11] Patent Number: 4,469,508

[45] Date of Patent: Sep. 4, 1984

[54] PROCESS AND INSTALLATION FOR HEATING A FLUIDIZED BED BY PLASMA INJECTION

[75] Inventors: Jacques Amouroux, Bure S. Yvette; Siméon Cavadias, Paris, both of France

[73] Assignee: Electricite de France (Service National), France

[21] Appl. No.: 486,761

[22] Filed: Apr. 20, 1983

[30] Foreign Application Priority Data

Apr. 30, 1982 [FR] France ................................ 82 07530

[51] Int. Cl.³ .......................... C22B 4/00; C22B 1/10; B23K 9/00
[52] U.S. Cl. ....................................... 75/10 R; 75/26; 219/121 P
[58] Field of Search ............... 75/10 R, 26; 219/121 P

[56] References Cited

U.S. PATENT DOCUMENTS 2,894,831  7/1959  Old ......................................... 75/26
3,404,078  10/1968  Goldberger ........................ 204/164

Primary Examiner—Peter D. Rosenberg
Attorney, Agent, or Firm—Alan H. MacPherson; Steven F. Caserza; Thomas S. MacDonald

[57] ABSTRACT

A substance to be treated is brought into a treatment column (10) and kept in suspension (11) in the latter by the injection (A) of a fluidizing gas into the bottom part of the column.

According to the invention, a plasma is injected (D) into the column in at least one direction within a radial plane relative to the column.

Preferably, the plasma is produced by high-frequency induction and injected at a pressure of the order of atmospheric pressure, so as not to perturb the fluidization of the bed and so as to permit good interpenetration of the various gas streams.

Applications to the synthesis of nitrogen oxides, to the gasification of a carbonaceous substance and to the reduction of ores, as well as to the roasting or drying of materials.

15 Claims, 3 Drawing Figures

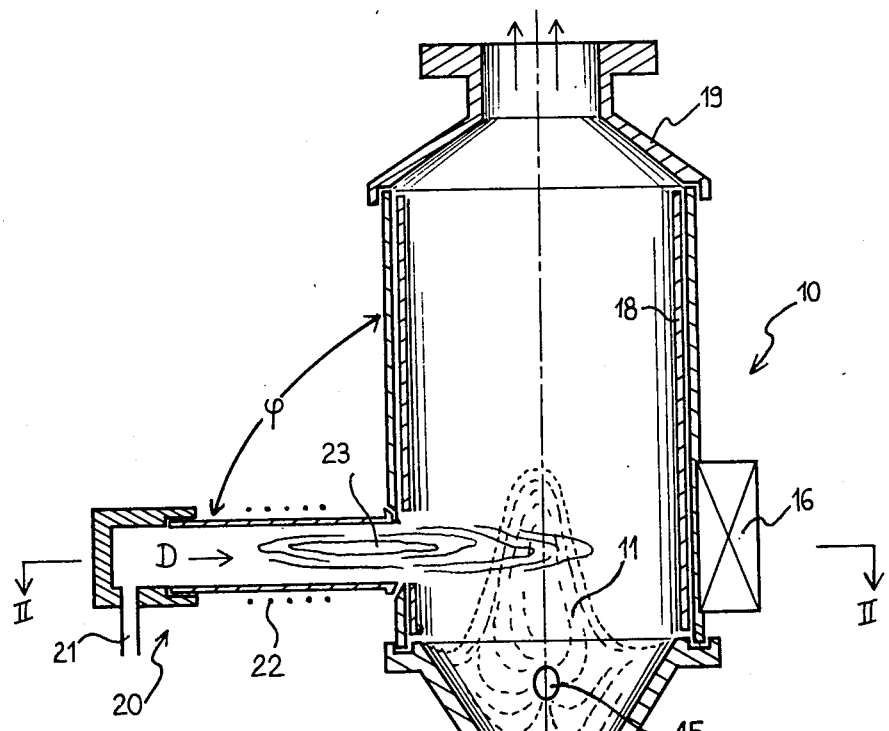
FIG_1
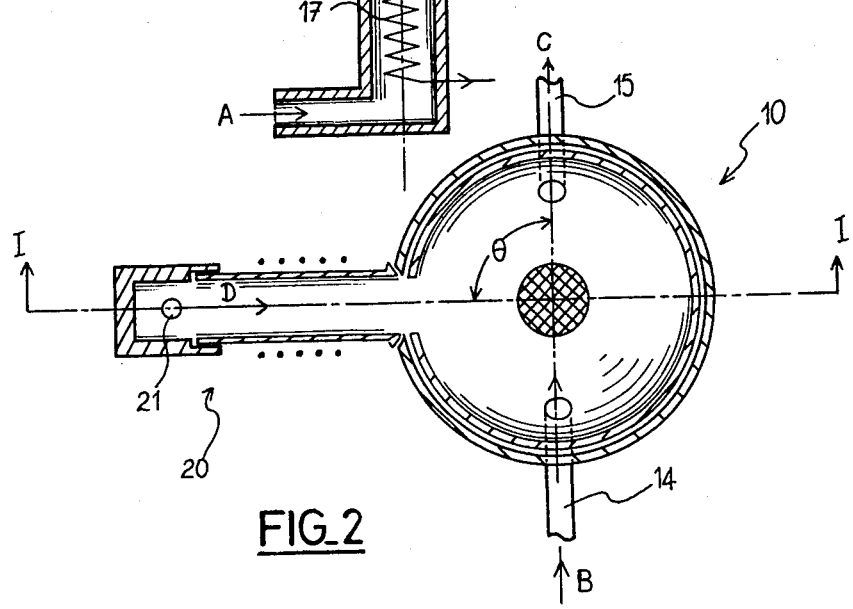
FIG_2

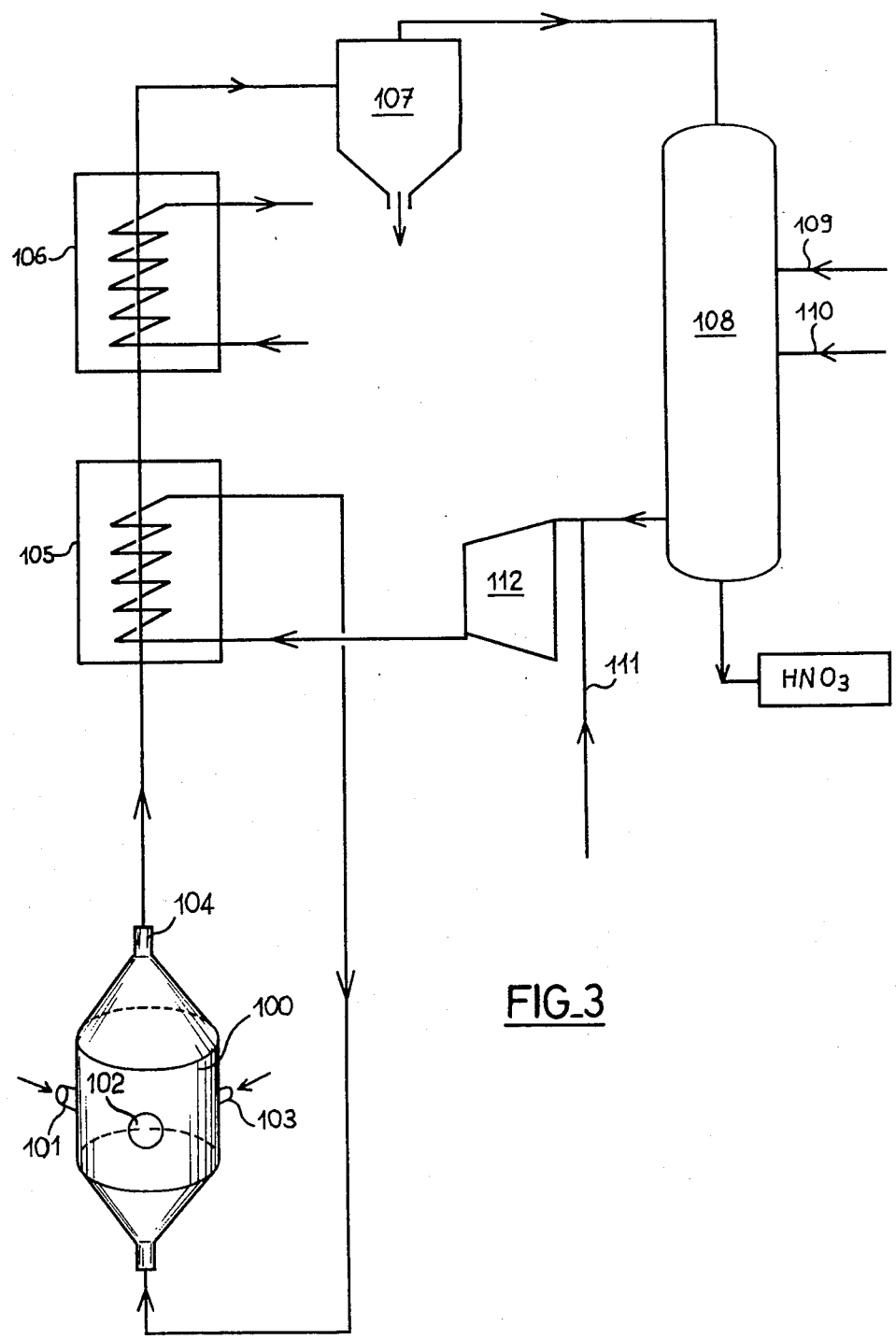
FIG_3

PROCESS AND INSTALLATION FOR HEATING A FLUIDIZED BED BY PLASMA INJECTION

The present invention relates to a process for heating a fluidised bed and also to an installation for carrying out this process and to its applications to the synthesis of nitrogen oxides, to the gasification of a carbonaceous substance and to the reduction of ores.

As is known, a fluidised bed of a substance to be treated is formed by bringing the substance, in the solid phase and divided up in the form of particles, into a treatment chamber, for example a vertical column, and by injecting a fluidising gas into the bottom part of this column, in the axial direction, in order to keep the particles of the substance in motion.

It is thus possible to carry out a number of chemical reactions in the heterogeneous phase with enhanced efficiency, by virtue of the continuous motion of the suspended particles. The process can also be used for reactions in the gas phase, in which case the fluidised bed is a catalyst bed consisting of particles of a catalyst for the reaction. Finally, it can also be employed for purely physical treatments such as the encapsulation or drying of materials.

If it is desired to heat the fluidised bed to a high temperature, various difficulties arise: the heating of fluidising gas does not always make it possible to achieve sufficiently high temperatures, because of the physical limits to the strength of the materials of the system for injecting this gas and of the grid which is generally located at the base of the column to retain the fluidised bed: this element is frequently of fragile structure and is likely to be destroyed by an excessively high temperature of the fluidising gas.

Furthermore, heating through the walls of the column cannot simultaneously ensure a high temperature and a homogeneous distribution thereof inside the bed.

To overcome these disadvantages and make it possible to heat the fluidised bed homogeneously and to a high temperature, the process of the invention proposes to produce a plasma from a plasmagenic gas of predetermined composition, and to inject this plasma into the fluidised bed in at least one direction.

Preferably, each direction of injection is within a radial plane relative to the column.

The plasma is produced by high-frequency induction or by an arc and is injected at an injection pressure of the order of 0.5 to 10 bars; however, the process of the invention can be carried out with higher pressures.

The injection is thus performed without substantial perturbation of fluidisation of the bed of particles; the interpenetration of the various gas streams (fluidising gas, plasmagenic gas and, if appropriate, feeding of the column by the substance to be treated) is optimal and the heat transfer between plasmagenic gas and particles is very efficient by virtue of the continuous motion of the particles, which remain uniformly mixed.

Finally, the difficulties of the stability of the materials at high temperatures, encountered in the earlier technique, are avoided here by virtue of the fact that the plasma at very high temperature remains confined in a zone extending between the torch (where the molecular dissociation of the plasmagenic gas takes place, producing the plasma) and the inside of the fluidised bed. (Nevertheless, the plasma still arrives at the core of the fluidised bed.) The walls of the column, and also the grid located at its base and the device for feeding the fluidising gas, remain protected from the very high temperatures of the order of 2,000° to 3,000° C. and are only subjected to the peripheral temperature of the fluidised bed.

The plasma is in fact employed here as an intermediate heat-transfer agent, which receives the heat from the means for heating the torch (electric arc or high-frequency plasma torch) and the distributes it to the substance to be treated. Thus, the various elements of the installation are only heated indirectly and to temperatures at which their heat stability is achieved without difficulty by conventional techniques.

Moreover, this heating is carried out with a greater efficiency than that of the conventional processes: it is found experimentally that about 95% of the electrical energy is transmitted to the plasma, compared with a maximum energy efficiency of 70% for the best combustion burners.

Furthermore—and in contrast to the conventional processes for heating a fluidised bed by means of a combustion torch—controlling the composition of the plasmagenic gas, which is chosen to be reducing or oxidising according to the applications, enables it to participate in the chemical reaction taking place between the plasmagenic gas, the fluidising gas and the material suspended in the fluidised bed. Apart from the energy aspect of the plasma torch (heat-transfer function of the plasma), it thus acts as a chemical source for feeding the reactor, without a toxic or troublesome by-product as with combustion torches.

It is possible to carry out a continuous treatment of materials. Preferably, the plasma is injected by three torches arranged in three substantially symmetrical, radial directions relative to the axis of the column; the substance to be treated can be fed in at a level close to that of the mouths of the torches. The treated substance is removed from the top or the base of the fluidised bed, depending on the properties acquired by the material (increase in its density, reduction in size, fragmentation or the like).

Other characteristics and advantages of the invention will become apparent on reading the detailed description of an illustrative embodiment below, which is given with reference to the attached figures, in which:

FIG. 1 is a sectional view in elevation of an installation according to the invention, along the line I—I of FIG. 2, FIG. 2 is a plan section of this same installation, along the line II—II of FIG. 1, and FIG. 3 is a diagrammatic representation of an installation applying the process of the invention to the synthesis of nitrogen oxides and to the production of nitric acid.

The treatment column 10 is vertically orientated; it can be of cylindrical shape. The particle bed 11 is kept in suspension by means of a fluidising gas injected (arrow A) into the bottom part of the column, in the axial direction, through a pipe 12. A grid 13 retains the fluidised bed and prevents it from obstructing the pipe 12.

The column is lined with a refractory covering 18. Moreover, provision is made for cooling of the walls of the column—and in particular opposite the mouth of the plasma torch 20—for example by a circuit, represented symbolically by reference 16, in which water circulates.

Furthermore, it may be advantageous to make provision for preheating of the fluidising gas, for example by means of an electrical resistor 17 located in the pipe 12.

In this FIG. 1, it is noted that the fluidising gas is injected, approximately along the axis of the column, through a tube of small cross-section, which widens until it reaches the cross-section of the column, in accordance with a conventional arrangement. Advantageously, and in contrast to the conventional arrangement in which the retaining grid is placed at the top of the widened part, it is preferred to place this grid 13 upstream of the widened part, that is to say at a point in the tube which is of small cross-section.

This produces a substantial convective motion of the fluidised bed along the axis of the column, that is to say at the mouth of the plasma torch, where the temperature is highest.

The treatment column can also comprise pipes coming out into the fluidised bed, for feeding in (14) the substance to be treated (arrow B) and removing (15) this same treated substance (arrow C). It is thus possible to treat this substance continuously. (In the case where the substance to be treated is entirely consumed in the treatment column, the removal of solid reaction products is unnecessary and the pipes 14 and 15 can both be used for feeding the fluidised bed.)

A plasma torch 20 makes it possible to inject a plasmagenic gas (arrow D) through a pipe 21. The molecules of this gas are dissociated into positive ions and into electrons by virtue of an electromagnetic field at a high frequency of the order of 10 to 40 GHz, produced by induction coils 22, so as to form a plasma 23 at very high temperature.

This plasma is injected by the torch at angles of incidence $\phi$ (relative to the axis of the column) and $\theta$ (relative to the direction of feed of the substance to be treated), which can vary as a function of the working parameters inside the particle bed kept in suspension.

Preferably, the direction of injection of the plasma forms an angle $\phi$ of between 45° and 90° (if several torches are used, it is desirable to prevent them from opposing one another, which would be the case for an angle $\phi$ of the order of 90°) and an angle $\theta$ of between 30° and 90°.

As a variant, to obtain larger amounts of heat, it is possible to produce the plasma not by high-frequency induction, but by an electric arc obtained between two electrodes. Also as a variant, it is possible to use a plurality of plasma torch, for example three torches arranged at one and the same angle $\phi$ relative to the axis of the column, but distributed uniformly around the latter, with radial symmetry, at 120°.

Finally, the gases (fluidising gas, gaseous reactants and the like) are removed from the top 19 of the column.

EXAMPLE I

In one embodiment of the invention, the plasma torch was composed of a quartz tube of diameter 30 mm, with 5 induction coils located at a distance of 10 mm from the fluidised bed and supplied by a 40 MHz high-frequency generator marketed by the DURR Company. A generator of this type makes it possible, in particular, to produce air plasmas at low power (2 to 4 kW).

The plasma, which was an argon or air plasma, was injected at a pressure of the order of atmospheric pressure, at rates varying from 10 to 30 liters per minute.

The fluidised bed was kept in a quartz enclosure of diameter 80 mm by a grid of wire gauze. The particles were fluidised by a gas flowing at a rate depending on the size and the density of the particles.

The process and the installation according to the invention are applicable to numerous treatments of materials, three examples of which will be described below (without implying a limitation); it is also possible to envisage purely physical treatments such as the drying or encapsulation of the materials.

EXAMPLE II

Firstly, the invention can be applied to the synthesis of nitrogen oxides by immersion in a catalyst bed. In this case, the fluidising gas is oxygen or air and the plasmagenic gas is nitrogen or a nitrogen/oxygen mixture (oxygen-enriched air). The particulate substance constituting the fluidised bed is then a catalyst for the nitrogen oxidation reaction. Choosing the flow rates and compositions of the fluidising and plasmagenic gases makes it possible to optimise the respective amounts of nitrogen and oxygen injected into the reactor. It also makes it possible to adjust the temperature gradient between the temperature of the mixture at the point where it is heated by the plasma (or the order of 2,000° to 5,000° C.) and the average temperature of the catalyst bed, where the immersion takes place (of the order of 1,000° C.).

The fluidised catalyst bed under plasma thus performs the triple function of mixing the reactants (by mechanical entrainment effect), of catalysing the chemical reaction and, finally, of immersing the reaction mixture in the agitated reactor.

More precisely, the installation used was like the one described in Example I, the flow rate of fluidising gas used was 12 liters/minute and the flow rate of plasmagenic gas used was 13 liters/minute, thus producing a gas output rate of 25 liters/minute at the top of the column (the rates indicated are corrected to normal temperature and pressure conditions).

In one case where the hot gases leaving the reactor were recycled, prior heating of the fluidising gas was introduced by means of a 250 W electrical resistor controlled by a rheostat. A metal enclosure around the quartz tube ensured that the device was leaktight.

The catalyst used was 4% of NiO and 25% of $WO_3$ on an alumina support. The particle size distribution was chosen between 207 and 250 $\mu$m. The amount employed was 50 g. An example of the composition of the gases entering and leaving the reactor is given in the table which follows:

|  | Reactor inlet (liters/minute) | | | Reactor outlet (liters/minute) |
| --- | --- | --- | --- | --- |
|  | Plasmagenic gas | Fluidising gas | Total gas |  |
| $NO_2$ | 0 | 0 | 0 | 0.7 |
| $N_2$ | 7 | 6 | 13 | 12.5 |
| $O_2$ | 6 | 6 | 12 | 11.8 |

Taking account of these flow rates and of the effective power of the torch, which was 3 kW, the energy induced in this example was 2.1 kcal/liter of total gas and the energy of formation was 20 kWh/kg of $HNO_3$.

FIG. 3 diagrammatically shows an installation for the production of nitrogen oxides and $HNO_3$ by this process: the reactor 100, under a fluidised bed, is heated, for example, by three plasma torches 101, 102, 103, the plasmagenic gas being air. The gaseous products are removed through a pipe 104 as far as a first heat exchanger 105 at a high temperature (1,500° to 2,000° C.), where they yield some of their heat to the fluidising gas, thus preheating the latter. A second heat exchanger 106 at a moderate temperature (1,000° to 1,500° C.) provides additional cooling of the gaseous products, while permitting, as a subordinate function, the production of high-pressure steam for various uses, for example.

The gaseous products (the temperature of which has then dropped to a value below 300° C.) are then directed into a cyclone separator 107, which recovers the fine particles of the fluidised bed which have been entrained and have remained suspended in the gaseous products. The latter are then directed into a scrubbing tower 108 fed with air and water through pipes 109 and 110. In this scubbing tower, the nitrogen oxides are converted to nitric acid. Furthermore, the atmosphere of the scrubbing tower (air or nitrogen/oxygen mixture) is extracted and enriched in suitable proportions with air or oxygen brought through a pipe 111. The resulting mixture is compressed in a compressor 112 and then heated in the high-temperature exchanger 105 mentioned above, before being injected back into the reactor 100, of which it constitutes the fluidising gas.

EXAMPLE III

Secondly, the invention can be applied to the gasification of a carbonaceous substance (for example coal) by steam cracking. In this case, the fluidising gas is steam which has already been superheated (in the conventional manner) and the plasmagenic gas is hydrogen (or a steam/hydrogen mixture), constituting the reducing gas. In this way, the chemical composition of the gas entering the reactor can have an $H_2/O_2$ ratio varying between 2 and 5.

The fluidised bed consists of the carbonaceous substance brought into the form of particles (300 to 800 $\mu$m) by prior grinding. The temperature of the fluidised bed is of the order of 2,000° to 2,500° C. (ensuring more rapid pyrolysis and the absence of tar residues) for a plasma temperature of the order of 4,000° to 6,000° C. (the fragmentation of the water molecule is effective above 3,000° C.).

In contrast to the previous application, the fluidised bed is here consumed by the plasma. It is therefore appropriate to make provision for continuous feeding of the bed. A continuous operation of this type was not possible using the conventional techniques, in which it was necessary to alternate cycles for heating the carbonaceous substance by the burner with cycles for heating the steam.

The gases leaving the reactor contain essentially hydrogen, acetylene, carbon monoxide and ethylene.

If, at the outlet of the reactor, fine particles are found which result from the coal particles after reaction with the gases and progressive reduction of their size, these particles can easily be recovered by a cyclone separator.

This process permits a degree of conversion of the coal of the order of 90%.

EXAMPLE IV

Thirdly, the invention can be applied to the reduction of ores or other materials in the form of particles.

These materials are brought continuously into the fluidised bed so as to be heated by the plasma to a temperature allowing reduction, the plasmagenic gas being a reducing gas such as hydrogen.

What we claim is:

1. A process for heating a fluidised bed, comprising:
   feeding a substance in the form of particles into a vertical treatment column;
   fluidizing said particles in suspension therein by the axial injection of fluidising gas into a bottom part of the column to form a fluidized bed;
   producing a high temperature plasma from a plasmagenic gas of predetermined composition; and
   injecting said plasma into the fluidised bed in at least one radial direction from a position ouside said column above said bottom part and wherein said high temperature plasma is confined within a zone of the fluidized bed so that the walls of said column and said bottom part of the column are protected from the high temperature of said plasma.

2. A process according to claim 1, wherein each direction of injection is within a radial plane relative to the column.

3. A process according to claim 1 wherein the plasma is injected at a pressure of 0.5 and 10 bars.

4. A process according to claim 1, wherein each direction of injection of the plasma forms an angle ($\phi$) of between 45° and 90° with the axis of the column.

5. A process according to claim 2 wherein the direction in which the particulate substance is brought into the column forms an angle ($\theta$) of between 30° and 90° with the radial plane comprising one direction of injection of the plasma.

6. A process according to claim 2, wherein the plasma is injected in three substantially symmetrical, radial directions, relative to the axis of the column.

7. A process according to claim 1, wherein the particulate substance is brought into the fluidised bed and extracted therefrom continuously.

8. An installation for carrying out the process according to claim 1, comprising:
   a vertical treatment column;
   means for producing a plasma from a plasmagenic gas and for injecting said plasma in at least one direction into a fluidised bed contained in said column at an intermediate level;
   means for injecting a fluidising gas into a bottom part of the column, in the axial direction; and
   means for feeding the column and said fluidizing gas with a substance in the form of particles, which feeding means is located at a vertical level between the means for injecting plasma and the means for injecting fluidising gas and near that intermediate level at which the plasma is injected into the fluidised bed.

9. An installation according to claim 8, wherein the means for injecting gas into the bottom paart of the column comprises a tube of small full cross-section which widens until it reaches the cross-section of the column, and including a grid located at the mouth of the tube, upstream of the widened part.

10. The process according to claim 1 wherein the fluidising gas is air or oxygen, the plasmagenic gas is nitrogen or a nitrogen/oxygen mixture and the particulate substance is a catalyst for a nitrogen oxidation reaction, whereby the process is one for the synthesis of nitrogen oxides.

11. The process according to claim 1 wherein said particulate substance is a ground carbonaceous substance and including the step of continously feeding into the fluidised bed a plasmagenic gas containing hydrogen and wherein the fluidising gas comprises steam, whereby the process is one for the gasification of the carbonaceous substance by means of steam.

12. The process according to claim 1 wherein said particulate substance is continously fed into the fluidised bed and the plasmagenic gas contains hydrogen, whereby the process is one for the reduction of the particulate substance.

13. The process of claim 1 comprising producing said plasma by plasmagenic gas in a high frequency electromagnetic field exterior of said column.

14. The process of claim 1 wherein said plasma is injected into said bed at a temperature of the order of 2000° to 3000° C.

15. The process of claim 1 wherein the composition of said plasmagenic gas is reducing or oxidizing dependent on the chemical reaction taking place in said fluidised bed between plasmagenic gas, fluidising gas and said particulate substance.

* * * * *

UNITED STATES PATENT AND TRADEMARK OFFICE
CERTIFICATE OF CORRECTION

PATENT NO. : 4,469,508
DATED : 9/4/84
INVENTOR(S) : Jacques Amouroux and Simeon Cavadias It is certified that error appears in the above—identified patent and that said Letters Patent is hereby corrected as shown below:

Claim 9, line 2, change "paart" to --part--.

Claim 9, line 3, delete "full".

Signed and Sealed this

Tenth Day of December 1985

[SEAL]

Attest:

DONALD J. QUIGG

Attesting Officer

Commissioner of Patents and Trademarks